United States Patent [19]

Takahashi et al.

[11] 4,220,537

[45] Sep. 2, 1980

[54] DRUM TYPE DISC FILTER DEVICE FOR PAPER PULP SLURRY

[75] Inventors: Risaburo Takahashi; Mitsuo Takahashi, both of Fiji, Japan

[73] Assignee: Seicho Machinary Co., Ltd., Fuji, Japan

[21] Appl. No.: 966,756

[22] Filed: Dec. 5, 1978

[30] Foreign Application Priority Data

Jul. 3, 1978 [JP] Japan .................................. 53-80764

[51] Int. Cl.² ...................... B01D 25/34; B01D 33/36
[52] U.S. Cl. ............................... 210/333 R; 162/390; 162/391; 162/410; 210/332
[58] Field of Search ............... 162/391, 410, 228, 230, 162/390; 210/404, 411, 77, 82, 332, 333 R, 393

[56] References Cited

U.S. PATENT DOCUMENTS

| Re. 27,326 | 4/1972 | Sheaffer | 210/404 X |
| 1,057,475 | 4/1913 | Young | 210/393 X |
| 1,649,581 | 11/1927 | Genter et al. | 210/404 X |
| 3,193,105 | 7/1965 | Putnam | 210/332 X |
| 3,471,026 | 10/1969 | Riker | 210/332 |
| 4,032,442 | 6/1977 | Peterson | 210/333 R |

Primary Examiner—Richard V. Fisher
Attorney, Agent, or Firm—Wenderoth, Lind & Ponack

[57] ABSTRACT

A drum type disc filter device for dehydrating paper pulp slurry. The drum and the disc filters are axial drain chambers and sector type filter members. Pressurized air is fed into the drain chambers sequentially when each drain chamber and corresponding filter members are at a predetermined angle of rotation of the drum. Paper guide plates are secured between the disc filters to guide separated paper pulp cakes safely into a chute without causing interference of lumping of the paper pulp cakes.

1 Claim, 6 Drawing Figures

DRUM TYPE DISC FILTER DEVICE FOR PAPER PULP SLURRY

BACKGROUND OF THE INVENTION

The present invention relates to a drum type disc filter device for concentrating paper pulp slurry having a predetermined viscosity and more particularly to a drum type disc filter device including a rotatable drum including drain chambers, a plurality of generally annular disc filters disposed on the peripheral wall of the drum and axially spaced from each other, means for communicating the inside surfaces of the disc filters with the drain chambers, and means for creating negative water pressure on the inside surfaces of the disc filter for drawing through the filtrate of the paper pulp, the paper pulp thereby becoming attached to the outside surface of the disc filter with the filtrate being drawn into the filters.

Such a drum type disc filter device is well known. To separate concentrated paper pulp attached as filter cake on the outside surfaces of the disc filters, water or air is directed from the outside at a generally tangential direction to the outside surfaces of the disc filters so that the paper pulp is progressively separated edgewise from the disc filter surfaces. As the directed air force component acts from the outside to the inside of the disc filter, some pulp tends to pass into the filter mesh of the disc filter and so the separating action is not satisfactory. When directed water is used, dewatered paper pulp still contains much water. Also, each filter layer of the disc filters must be combined with one or more accurately positioned air or water nozzles, so that the disc filter device becomes complicated and adjustment of the nozzles involves a lot of time consuming work.

SUMMARY OF THE INVENTION

The object of the present invention is to eliminate the above-described disadvantages and to provide an improved drum type disc filter device having an air separating means which acts from the inside to the outside of the disc filter in place of the known water directing means from outside.

According to the present invention, a drum type disc filter of the above described type comprises a drum having a plurality of partitioned drain chambers extending around its periphery. A plurality of individual filter members are attached to the drum and are located around the periphery and along the axis of the drum, each individual filter member along the axis communicating with each of the corresponding individual drain chambers and the individual filter members around the periphery being attached to each other to form individual filter discs. The above described drum has a plurality of the filter discs which extend along the axis of, and are attached to the drum with each individual filter member of each filter disc corresponding to a similarly positioned filter member of another filter disc along the axis of the drum for communicating with the same drain chambers. A means for introducing pressurized air into one drain chamber at a predetermined rotary position of said drum is used, whereby paper pulp attached as filter cake on the outer surfaces of said filter members communicating with the one drain chamber are forcibly separated by the pressurized air.

Preferably, the predetermined rotary position at which pressurized air is introduced is a position located slightly after top dead center of the drum is passed.

Preferably, the device further comprises a plurality of separate paper guide plates fixed between opposed disc filters at said predetermined rotary position.

As the disc filters and the drum are isolated into a plurality of filter members and communicating drain chambers, one or two of the drain chambers can be communicated with pressurized air without causing adverse effects to the other unit filters which are sucking filtrate and water from the attached paper pulp. The pressurized air in the drain chamber urges paper pulp or concentrated pulp slurry on the corresponding filter member surfaces uniformly from their outer surfaces so that the paper pulp is separated substantially simultaneously and completely from the filter member surfaces. The blow out of pressurized air from the inside also acts to clean the filter medium covering filter members so that plugging of the filter medium is also greatly decreased.

The features and advantages of the present invention will become more apparent from the following description with reference to the attached drawings in which:

DETAILED DESCRIPTION OF PREFERRED EMBODIMENT

Figure 1:
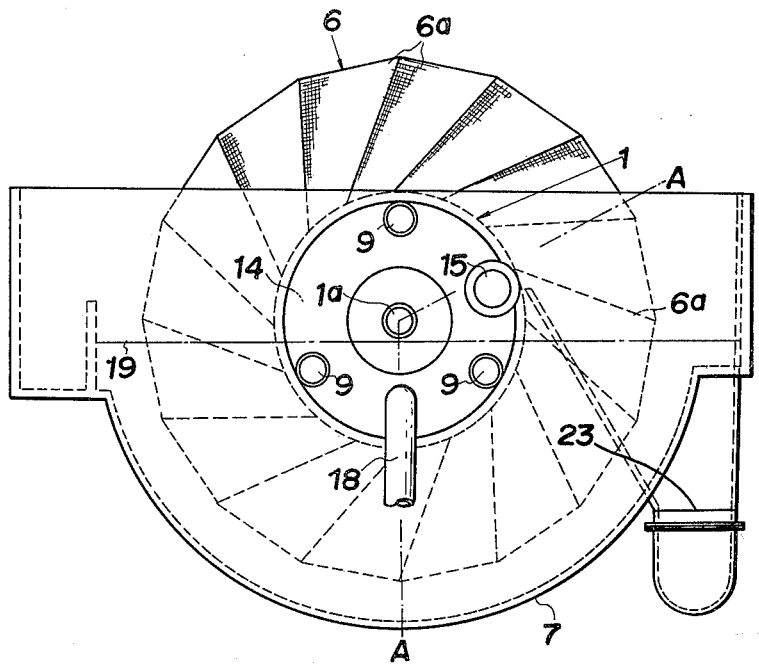
FIG. 1 is a side elevation view of a drum type disc filter device, of the present invention half immersed in a pulp slurry vat.
Figure 2:
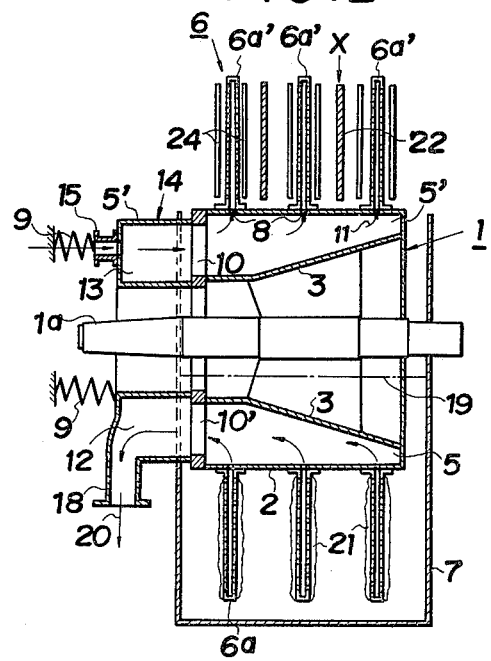
FIG. 2 is a sectional view along broken line A—A of FIG. 1.
Figure 3:
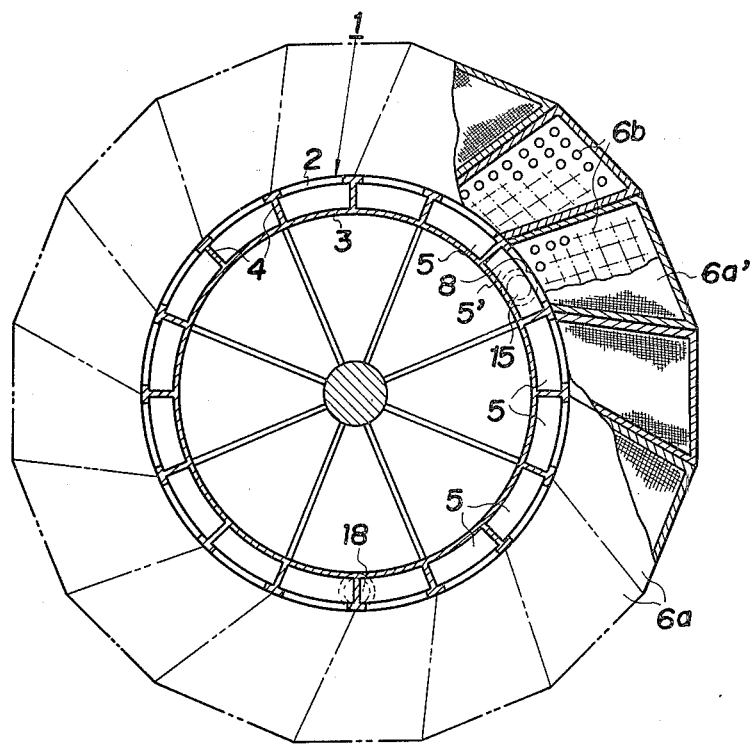
FIG. 3 is an enlarged part sectional view of the drum shown in FIG. 1.

Referring to FIGS. 1-3, a drum-type disc filter assembly for paper slurry, according to the present invention is rotatably mounted within a vat 7 so that generally the lower half of the filter assembly is immersed in paper pulp slurry in the vat 7 under liquid level 19. The disc filter assembly includes a drum 1 which has an outer peripheral wall 2 and a concentric inner peripheral wall 3 which is secured to a shaft 1a which is driven by a conventional driving motor not shown. The outer and inner peripheral walls form an annular space wherein a plurality of axial drain chambers 5 defined by a plurality of partition walls 4 which isolate the drain chambers from each other are located. On the other peripheral wall 2 portion which forms the outer wall of each drain chamber 5, a plurality of axially spaced sector shaped filter members 6A are secured. Each filter member 6a is secured to adjacent filter members around the periphery of the drum to form a disc filter 6. Thus a plurality of axially spaced disc filters 6 are mounted on the periphery of the outer peripheral wall 2. Both side walls of each disc filter 6 are perforated and are covered with a suitable filter medium if necessary.

The axially aligned filter members 6a communicate with one drain chamber 5 through an opening 8. The openings 8 may be a plurality of holes, or one or more windows on the outer peripheral wall 2. Thus watercontained in the pulp slurry which attaches to the side surfaces of the unit filters 6a passes through the unit filters 6a and the opening means 8 into the drain chamber 5, through which water is exhausted outwards as will be described later. Further, according to the present invention, each of the filter members 6a' and corresponding drain chamber 5' at a predetermined position, preferably a position which has passed upper dead center of the disc filters 6, communicate with pressurized air inlet 11 which creates uniform pressure from inside to outside along the entire surface of the filter members to forcibly separate the paper pulp attached on the surfaces of the filters members.

Figure 4:
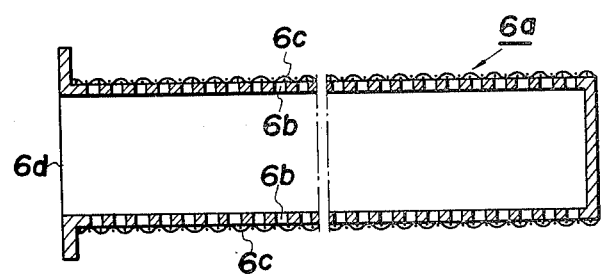
FIG. 4 is an enlarged diagrammatic section of a disc filter shown in FIG. 3.

The filter member 6a is formed as a flat box, as shown diagrammatically in FIG. 4, with both side walls provided with perforations 6b and covered by nets 6c communicating with the perforations 6b. The partition walls between adjacent filter members are not perforated so as to isolate the filter members from each other. The filter member 6a is secured to the drum 1 and one or more openings 6d are aligned with the openings 8 of one of the drain chambers 5. Thus, the filter member 6a of the disc filters 6 are aligned along the axis of the drum so that all of the filter members are axially aligned so as to communicate with one specific drain chamber 5.

Figure 6:
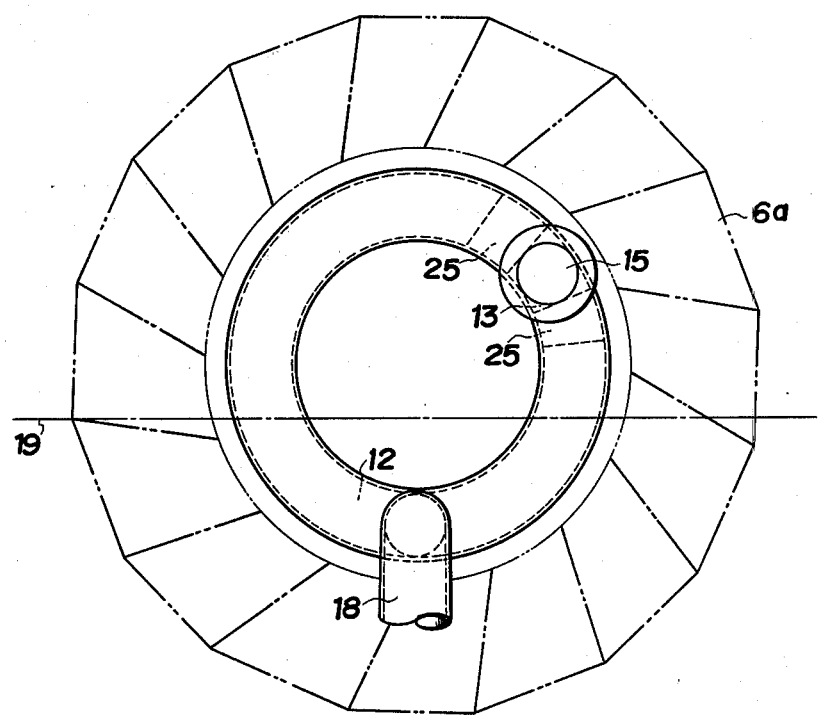
FIG. 6 is an enlarged diagrammatical left end view of FIG. 2.

As shown in FIGS. 1, 2 and 6, an air tight drain casing 14 which includes a water recovery chamber 12 and an air feed chamber 13 which are separated from each other by partition walls 25 are fixedly mounted on one side of the drum 1. The air feed chamber 13 communicates with the above described one or two air introducing drain chambers 5' at the specified position through an opening 10. The water recovery chamber 12 communicates with the other drain chambers 5 which are dipped in the pulp slurry in the vat 7 through the other opening 10'. A drain pipe 18 is attached to the drain casing 14 for communicating with the water recovery chamber 12. Water pressure in the drain pipe 18 or a pump means inserted in the pipe 18 produces suction through the water recovery chamber 12 and the drain chambers 5 within the filter members 6a which are immersed in the pulp slurry so that filtrate 20 in the filter members 6a is drained through the drain chambers 5 and the water recovery chamber 12 into the drain pipe 18. By the suction and filter action on the surfaces of the filter members 6a thick paper pulp 21 is attached as filter cake to the surfaces of the filter members 6a as the filter members 6a are successively immersed into and pass through the pulp slurry in the vat 7 by rotation of the drum 1. To cause paper pulp to be attached to the disc filter is well known and is not described further in detail.

According to the present invention, an air feed pipe 15 is secured to the drain casing 14 for communicating with the air feed chamber 13. Thus, each drain chamber 5 of the drum 1 successively communicates with the air feed chamber 13 when the drain chamber 5 is at the predetermined position and communicates with the opening 10 instead of the opening 10'. The drain chamber 5' and the filter member 6a' of the disc filters 6 when located at the specified position are fed pressurized air through the air feed pipe 15, the air feed chamber 13 and the opening 10. The pressurized air passes uniformly through the perforations 6b of the filter members 6a' from inside to outside thereby forcibly separating the paper pulp which is attached on the surface of the unit filter 6a' as individual filter cakes simultaneously. The drain casing 14 is urged by springs 9 against the side surface of the drum 1 to maintain an air and water seal between the fixed casing 14 and the rotating filter drum 1.

Figure 5:
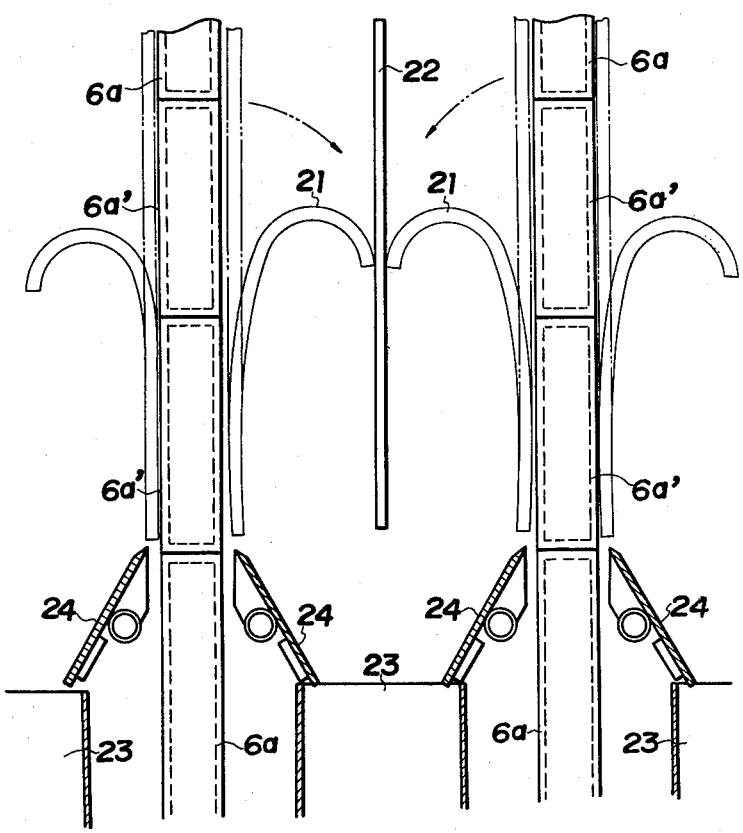
FIG. 5 is an enlarged partial plan view along arrow X of FIG. 2.

As shown in FIGS. 2 and 5, at the paper pulp separating position, i.e., a position in which the filter members of the drum 1 have passed the upper dead center position, a plurality of paper pulp chutes 23 are mounted to receive the paper pulp which is separated from both sides of the filter members 6a. Also, a plurality of doctors 24 are mounted to guide the separated paper pulp into the chute 23. The chutes and doctors are well known, however, as the paper pulp separate completely because of the inside air pressure, according to the present invention, the doctors 24 only act to guide the separated paper pulp into the chutes and the doctors do not positively separate the pulp from the filter surface.

Further, according to the present invention, separate paper guide plates 22 are mounted on a fixed member and extend between the disc filters where the filter members 6a' thereof receive the pressurized air from the drain chamber 5'. The guide plates 22 prevent the pulp cakes 21 which are separated from opposed outer surfaces of the filter members 6a' from interfering with each other, and guide the separated pulp cakes 21 downwards into the corresponding chutes 23. When the drum 1 has a plurality of disc filters 6 and the distances between the adjacent disc filters are small, interference between the injected air from the opposed surfaces of the unit filters 6a' may cause the separated pulp cakes 21 to lump together and possibly plug the chute entrance. The guide plates 22 effectively prevent the separated pulp cakes 21 from interfering with each other and guide the pulp cakes 21 into the chute 23.

It will be appreciated that by introducing pressurized air into the filter members at a predetermined position for urging the paper pulp attached to the outer surfaces of the filter members uniformly away from the filter surfaces. The pulp cakes separate substantially simultaneously and completely from the outside surface of the filter members. As the separating force of the pressurized air acts on the whole inside surfaces of the filter member 6a' uniformly and simultaneously, substantially no pulp remains on the filter surface, and plugging of the filter mesh is thereby avoided.

In conventional drum type disc filter, water is jetted against the outer surface of the filter for separating the paper pulp attached to the outer surface of the filter. As the jetted water force component is directed from the outside to the inside of the filter surface, some pulp is urged into the filter and drained as sludge. Additionally, some pulp is plugged into the mesh of the filter surface thereby reducing the filter effect of the disc filter. Also, two sets of water directing nozzles aligned at accurate angles for each disc filter are necessary.

According to the present invention, all axially aligned unit filters are supplied with pressurized air which is introduced in one drain chamber at a predetermined position, to effectively separate the attached pulp cakes on the filter members simultaneously. Thus, the device is greatly simplified and the separating effect is also substantially improved.

What is claimes is:

1. A drum type disc filter device for dehydrating paper pulp slurry, comprising:
   (a) a vat;
   (b) a shaft rotatably mounted within said vat;
   (c) a rotatable drum mounted on said shaft within said vat;

(d) a plurality of drain chambers located on the outer surface each extending along the drum and said chambers being adjacent each other around the periphery of said drum, and integral with said drum;

(e) a plurality of filter members attached to said rotating drum, both around the periphery and along the axis of said drum, said filter members being attached to other filter members around the periphery of said drum to form a plurality of filter discs surrounding said drum and located at spaced intervals along the axis of said drum, said individual filter members of said filter discs which are aligned with each other along the axis of said drum, communicating with a single drain chamber;

(f) fluid suction pressure means successively connected to said drain chambers as said drain chambers are rotated by said drum through said paper pulp slurry, for causing paper pulp to attach itself to said portion of said filter discs communicating with said drain chambers which are submersed in the said paper pulp slurry;

(g) air pressure means for successively introducing pressurized air into one of said drain chambers as said drum is rotated into a predetermined position of rotation, wherein said drain chambers having pressurized air introduced into them are positioned outside of said vat and past the upper center position of rotation of said drum for separating said paper pulp which is attached to corresponding filter disc filter members;

(h) an exit chute for removing said paper pulp from said vat and filter discs; and (i) paper guide plates fixedly secured between adjacent filter discs at said predetermined position of rotation wherein said paper pulp is separated, said paper pulp being separated as individual cakes from said filter members, said paper guide plates preventing blockage of said chute and lumping of said paper pulp cakes with each other.

* * * * *